United States Patent
Jiang et al.

(10) Patent No.: US 11,723,381 B2
(45) Date of Patent: *Aug. 15, 2023

(54) LOW 4-METHYLIMIDAZOLE CARAMEL COLOR CLASS IV PRODUCTION

(71) Applicant: CORN PRODUCTS DEVELOPMENT, INC., Westchester, IL (US)

(72) Inventors: Hongxin Jiang, Bridgewater, NJ (US); Christopher Lane, Bridgewater, NJ (US)

(73) Assignee: Corn Products Development, Inc., Westchester, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/358,174

(22) Filed: Jun. 25, 2021

(65) Prior Publication Data

US 2022/0159990 A1    May 26, 2022

Related U.S. Application Data

(63) Continuation of application No. 14/844,351, filed on Sep. 3, 2015, now Pat. No. 11,058,127.

(60) Provisional application No. 62/076,519, filed on Nov. 7, 2014.

(51) Int. Cl.
 *A23G 3/32* (2006.01)
(52) U.S. Cl.
 CPC ................................ *A23G 3/32* (2013.01)
(58) Field of Classification Search
 CPC ........................................................ A23G 3/32
 See application file for complete search history.

(56) References Cited

U.S. PATENT DOCUMENTS

| | | |
|---|---|---|
| 2,767,108 A | 10/1956 | Fetzer |
| 2,582,261 A | 1/1958 | Longenecker |
| 3,385,733 A | 5/1968 | Ackermann |
| 4,614,662 A | 9/1986 | Ramaswamy |
| 2010/0003383 A1 | 1/2010 | Parker et al. |
| 2016/0221961 A1 | 8/2016 | Jiang et al. |

*Primary Examiner* — Nikki H. Dees
(74) *Attorney, Agent, or Firm* — Rachael Casey

(57) ABSTRACT

A process of making a caramel color comprising a) mixing a carbohydrate with an ammonia compound and a sulfite compound and at pH from just greater than about 4.0 to about 6.0; and b) heating of the mixture from step a) in a sealed vessel to a temperature of from about 120° C. to about 137° C. and maintaining a temperature in said range for at least about 2 hours, said time and temperature being sufficient to yield a product having a color level of at least about double strength and a level of 4-MeI of less than about 20 ppm, is provided. Also provided is a process of ramped heating which results in a similar caramel color product.

15 Claims, No Drawings

LOW 4-METHYLIMIDAZOLE CARAMEL COLOR CLASS IV PRODUCTION

CROSS-REFERENCE TO RELATED APPLICATIONS

This application is a continuation of U.S. patent application Ser. No. 14/844,351, filed Sep. 3, 2015, which claims the benefit of U.S. Provisional Application No. 62/076,519, filed Nov. 7, 2014, each of which is hereby incorporated herein by reference for all purposes.

BACKGROUND OF THE INVENTION

4-Methylimidazole (1, hereinafter 4-MeI) is a heterocyclic organic chemical compound formed in the browning of certain foods through the Maillard reaction between carbohydrates and nitrogen compounds. It is found in roasted foods, grilled meats, coffee, and in types of caramel color produced with ammonia-based processes. Scheme 1 sets forth the likely reactions taking place during the caramel color production process.

Scheme 1

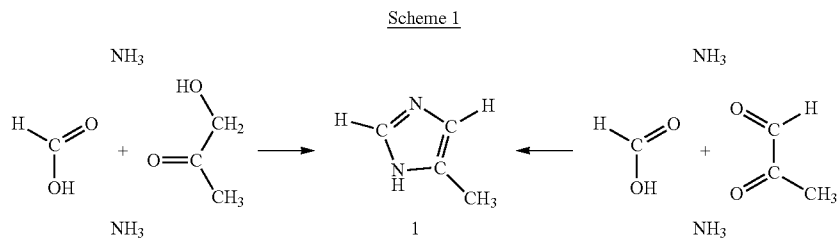

Caramel color is one of the oldest and most widely-used food colorings, and is found in almost many commercially produced foods. Caramel color is manufactured by heating carbohydrates, alone or in the presence of acids, bases, and/or salts. There are four classes of caramel color, classified according to the reactants used in their manufacture, each with its own Class and INS, as listed in Table 1 which follows.

TABLE 1

| Class | INS No. | Name | Preparation | Uses |
|---|---|---|---|---|
| I | 150a | Plain caramel | No ammonium or sulfite compounds used | Whiskey and other high proof alcohols |
| II | 150b | Caustic sulfite caramel | Sulfite compounds but no ammonium compounds used | Cognac, sherry and some vinegars |
| III | 150c | Ammonia caramel, baker's caramel, confectioner's caramel, or beer caramel | Ammonium compounds but no sulfite compounds used | Beer, sauces, and confectionery |
| IV | 150d | Sulfite ammonia caramel, acid-proof caramel, or soft-drink caramel | Both sulfite and ammonium compounds | Acidic environments including soft drinks |

Caramel coloring of all types are considered safe and are approved by many leading regulatory agencies around the world, such as the European Food Safety Authority (EFSA), the US Food and Drug Administration (FDA), and the Joint FAO/WHO Expert Committee on Food Additives (JECFA).

U.S. Patent Publication No. 2010/0003383 teaches that conventional production of Class IV caramel colors of double strength made at high initial pH, i.e. a pH of above 5.0, leads to the production of high levels of 4-MeI. The solution proposed by this publication is the employment of an initial pH of less than 5.0, e.g. from about 2.0 to about 4.0.

Co-pending U.S. patent application Ser. No. 14/170,048, filed Jan. 30, 2014, teaches the employment of a pH below about 2.0, and especially pre-heating of a carbohydrate adjusted to a pH of below about 2.0 followed by gradual addition of a catalyst comprised of ammonium compounds and sulfite compounds, and then heating to a temperature between about 121° C. to about 140° C.

SUMMARY OF THE INVENTION

In a first aspect, this application relates to a process of making a caramel color comprising a) mixing a carbohydrate with an ammonia compound and a sulfite compound and at pH from just greater than about 5.0 to about 6.0, more typically from about 5.0 to about 5.5, and most typically from about 5.1 to about 5.3; b) heating the mixture from step a) in a sealed vessel to a temperature of from about 120° C. to about 137° C., more typically from about 125° C. to about 135° C., and most typically from about 128° C. to about 133° C., and maintaining a temperature in said range for at least about 1.5 hours, typically at least about 2 hours, typically from at least about 2.5 hours to about 7 hours, more typically from about 2.75 hours to about 6 hours, and most typically from about 3 hours to about 5 hours, said time being sufficient to yield a product having relatively higher color levels (e.g. at least about double strength) and relatively low levels of 4-MeI (e.g. less than about 20 ppm).

In a second aspect, this application relates to a process of making a caramel color comprising:

a) mixing a carbohydrate with an ammonia compound and a sulfite compound and at pH from just greater than about 4.0 to about 6.0, typically at least about 4.5, more typically at least about 5.0, typically from about 5.1 to about 6.0, and even more typically from about 5.1 to about 5.5;

b) heating the mixture from step a) in a sealed vessel to a first temperature of from about 80° C. and about 110° C. and holding at about that first temperature for a first hold time of at least about 30 minutes;

c) heating the product from step b) in a sealed vessel to a second temperature higher than the first temperature (e.g. at least about 5° C. higher) and less than about 130° C. and maintaining a temperature below about 130° C. for a second hold time of at least about 15 minutes;

d) heating the product from step c) in a sealed vessel to a third temperature higher than the second temperature (e.g. at least about 5° C. higher) and less than about 145° C. and for a third hold time of at least about 30 minutes. Typically, said first hold time is at least about twice as long as said third hold time and said third hold time is at least about twice as long as said second hold time.

It has been found that while pH is an important factor in limiting the amount of 4-MeI formed during caramelization to double strength color, the caramelizing temperature has an even greater impact. This is not apparent from the art discussed above and, thus, it was unexpected that the employment of a pH above 5.0 would produce double strength Class IV caramels having relatively low levels of 4-MeI.

DETAILED DESCRIPTION OF THE INVENTION

This application pertains in a first embodiment to a process with a first step comprising mixing a carbohydrate with an ammonia compound and a sulfite compound, if necessary adjusting the pH to a pH greater than about 5.0, typically just greater than about pH 5.0 to about pH 6.0, and then heating the mixture in a sealed vessel to a temperature of from about 120° C. to about 137° C. and holding the mixture within said temperature until a product with double strength caramel color is produced.

In a second embodiment, the first step of the process comprises mixing a carbohydrate with an ammonia compound and a sulfite compound, if necessary adjusting the pH to a pH greater than about 5.0, typically just greater than about pH 5.0 to about pH 6.0, then heating the mixture in a sealed vessel to a first elevated temperature, holding the mixture at said first elevated temperature for a period of time, and then heating the mixture to a second elevated temperature higher than the first elevated temperature and holding the mixture and said second elevated temperature, thus ramping the temperature of the mixture. The mixture is then held at an elevated temperature until a product with a caramel color with desired color intensity (e.g. double strength) is produced. The mixture can optionally be ramped to higher temperatures one or more further times, prior to the product reaching the color intensity of a double strength caramel color.

The carbohydrate may be derived from any native source, any of which may be suitable for use herein. Typical sources for the carbohydrate are cereals, tubers, roots, legumes and fruits. The carbohydrate may be refined derived from common sources of sugars such as sugar cane and sugar beet. They may also be derived by processes known in the art from native sources of starch such as varieties of corn (maize), pea, potato, sweet potato, banana, barley, wheat, rice, oat, sago, amaranth, tapioca (*cassava*), arrowroot, *canna*, and sorghum.

In one embodiment, the carbohydrate is a carbohydrate syrup, and in another embodiment, a corn syrup, wheat syrup, or mixtures thereof. In one aspect of the invention, the dextrose equivalent of the carbohydrate is 70 or greater and in another aspect is 80 or greater. As used herein, dextrose equivalent (DE) of a hydrolysis product is defined as its reducing power as a percentage of the reducing power of pure dextrose. DE may be calculated using the formula:

$$\text{Dextrose equivalent} = \frac{\text{milligrams of reducing sugar as dextrose} \times 100}{\text{milligrams of dry substance}}$$

Each starch molecule has one reducing end: therefore DE is inversely related to molecular weight. The DE of anhydrous D-glucose is defined as 100 and the DE of unhydrolyzed starch is virtually zero. If the carbohydrate used is in dry form, the carbohydrate should be mixed into solution (water) prior to use. In one embodiment, the carbohydrate used is in a solution of at least about 30 Baumé and in another of at least 35 Baumé.

The carbohydrate is mixed with a catalyst comprised ammonia or an ammonium compound and a sulfite compound. In one embodiment, the catalyst is ammonium bisulfite. The pH of the catalyst and/or the pH of the blend of acidified carbohydrate and catalyst may be adjusted as necessary using standard methods known in the art. For example, if the pH is to be adjusted upwards, any alkali such as potassium hydroxide or sodium hydroxide may be used, so long as the alkali is food grade. If the pH is to be adjusted downwards, an acid may be used. In one embodiment, an inorganic acid is used, and in another embodiment, the acid is selected from the group consisting of hydrochloric acid, sulfuric acid, sulfurous acid, sodium metabisulfite, and phosphorous based acids (in particular phosphorus and phosphoric acids), so long as the acid is food grade.

The pH of the mixture can be decreased using methods known in the art. In an embodiment, the pH in step (a) is decreased to just greater than 4.0 and in another embodiment greater than or equal to 4.1, or 4.2, or at pHs increasing in increments of 0.1 pH units to about pH 6.0. In an embodiment, the pH in step (a) is no greater than 6.0, and in another embodiment no greater than 5.9, or no greater than pHs decreasing from pH 5.9 in increments of 0.1 pH units to about pH 5.5. It should be noted that the pH will naturally decrease from the initial starting pH and no attempt should be made to arrest such natural decrease, e.g with the addition of a base or a buffer.

In one embodiment, the ratio of carbohydrate used in step (a) to that of the ammonium bisulfite used in step (b) is at least 1 to 3 to about 1 to 5 (weight/weight dry basis, hereinafter "w/w db"). In another embodiment, the ratio of corn syrup used in step a) to that of the ammonium bisulfite used in step b) ranges from about 1 to 3.5 to about 1 to 4.5 (w/w db). In another embodiment, the ratio of corn syrup used in step a) to that of the ammonium bisulfite used in step b) ranges from about 1 to 4 to about 1 to 4.4 (w/w db).

After the mixture of the carbohydrate and catalyst has been adjusted to the desired pH, the mixture is subjected to a regime of heating in a sealed vessel. In a first embodiment, the mixture is adjusted to a pH of just greater than about 5.0 to about 6.0, then heated to a temperature within the temperature range of about 120° C. to about 137° C., and then held within that range until the desired strength caramel coloring (e.g. double strength) is produced, but before the levels of 4-MeI are increased beyond target (e.g. less than about 20 ppm 4-MeI). Typically, the mixture is held at an elevated temperature until a sample of the neutralized product caramel color at 0.1% weight/volume (hereinafter "w/v") measured at 610 nm is at least double strength, i.e. is at least about 0.20 Uabs, more typically at least about 0.21 Uabs, and more typically at least about 0.22 Uabs, or even at least about 0.23 Uabs. The color intensity is measured by the test procedure described in the monograph prepared at the 55th JECFA (2000) and published in FNP 52 Add 8 (2000), the disclosure of which is incorporated herein by reference thereto.

In a second embodiment, the contents of the seal vessel are subject to a regime of one or more periods of ramped heating and maintaining or holding at an elevated temperature below about 120° C., followed ultimately by final ramping and heating at an elevated temperature that is below about 145° C. While maintaining the temperature of the mixture at a specific elevated hold temperature is convenient from the perspective of a simplified process, it is not technically necessary to strictly regulate the elevated temperature so long as the temperature is maintained below the upper limits as specified in the summary of the invention, above. Likewise, the specific hold times at each elevated temperature are not critical so long as the times at temperatures are maintained within the ranges specified in the summary above.

The temperature of the reaction mixture in the final hold step is maintained until the desired strength caramel coloring (e.g. double strength) is produced, but before the levels of 4-MeI are increased beyond target. In one embodiment, the time of the final hold is at least 30 minutes. In an embodiment, the time of step (e) is no more than 150 minutes, in yet another embodiment no more than 90 minutes.

In one aspect, this application relates to a process of making a caramel color comprising a) mixing a carbohydrate with an ammonia compound and a sulfite compound and at pH from just greater than about 4.0 to about 6.0; b) heating the mixture from step a) in a sealed vessel to a first temperature of from about 45° C. to about 75° C. and maintaining a temperature below about 75° C. for at least about 15 minutes, typically from at least about 30 minutes to about 2 hours; c) heating the product from step b) in a sealed vessel to a second temperature higher than the first temperature (e.g. at least about 5° C. higher) and less than about 85° C. and maintaining a temperature below about 85° C. for at least about 15 minutes, typically from at least about 30 minutes to about 2 hours; d) heating the product from step c) in a sealed vessel to a third temperature higher than the second temperature (e.g. at least about 5° C. higher) and less than about 100° C. and for at least about 30 minutes, typically from at least about 1 hour to about 3 hours; e) heating the product from step d) in a sealed vessel to a fourth temperature higher than the third temperature (e.g. at least about 5° C. higher) and less than about 130° C. and maintaining a temperature below about 130° C. for at least about 15 minutes, typically from at least about 30 minutes to about 1 hour; and f) heating the product from step e) in a sealed vessel to a fifth temperature higher than the fourth temperature (e.g. at least about 5° C. higher) and maintaining the mixture of step d) at a temperature from about 130° C. to about 145° C. over a time from about 15 minutes to about 2 hours, said times and temperatures being sufficient to produce a product caramel coloring having the desired levels of both color and 4-MeI.

As stated above, it has been found that while pH is an important factor in limiting the amount of 4-MeI formed during caramelization to double strength color, the caramelizing temperature has an even greater impact. This is not apparent from the art and, thus, it was unexpected that the employment of a pH above 4.0 would produce double strength Class IV caramels having low levels of 4-MeI. It was found that the use of a relatively lower hold temperature and/or a ramped heating regime (particularly one with a relatively longer hold time between about 80° C. and about 110° C. and then again between about 130° C. and about 145° C., with the hold time between about 130° C. and 145° C., being for a shorter time than the time at 80° C. to about 110° C.) allows for the production of double strength Class IV caramels having low levels of 4-MeI while employing pHs above 4.0. Without wishing to be bound by any particular theory, it is believed that the comparative kinetics and comparative thermodynamic of the various reactions which form color bodies and the various reactions leading to the formation of 4-MeI and its starting compounds allow for the unexpected "sweet spot" of relatively lower temperatures and higher pHs that was discovered and is described herein.

The vessel employed should be a sealed vessel capable of pressurization to the pressures that are anticipated during the reaction, e.g. from about 3.0 Kg/cm$^2$ to about 5.3 Kg/cm$^2$. Once the desired caramel color is obtained, the pressure is released to ambient pressure. In one embodiment, the temperature is decreased with the reduction of pressure to a temperature of no more than about 100° C. and in another embodiment to a temperature of no more than 90° C.

The resultant caramel color may be adjusted using standard methods known in the art. The degree Baumé and/or pH may be adjusted.

The resultant caramel color obtained by this process typically has a viscosity of less than 500 cps measured at 23° C. In another embodiment, the viscosity of the resultant caramel color obtained by this process is less than 200 cps measured at 23° C. In yet another embodiment, the viscosity of the resultant caramel color obtained by this process is less than 100 cps measured at 23° C. Viscosity, as used herein, is measured by Brookfield Viscometer using the analytical procedure set forth in the Examples section and is measured on caramel color adjusted to a Baumé of 30.0-31.0 at 15.5° C.

In one embodiment, the viscosity of caramel color obtained by this process is typically stable at a storage temperature of 40° C. for at least 8 weeks, and in another embodiment, the viscosity of caramel color obtained by this process is stable at a storage temperature of 40° C. for at least 12 weeks. As used herein, a stable viscosity is one which changes by no more than 50 cps from the initial viscosity (that prior to storage).

The resultant caramel color can be of different color intensities depending upon the cooking time, temperature and catalyst concentration. In one embodiment, the caramel color at 0.1% (w/v) measured at 610 nm is at least about 0.2 Uabs and in another embodiment is at least about 0.21 Uabs. Typically, the caramel color at 0.1% (w/v) measured at 610 nm is at least about 0.22 Uabs, and more typically at least about 0.23 Uabs. In one embodiment, the caramel color at 0.1% (w/v) measured at 610 nm is no more than 0.25 Uabs and in another embodiment is no more than 0.24 Uabs.

The resultant caramel color (at a Baumé of 30.0-31.0 at 15.5° C.) has a 4-MeI content less than 20 ppm, in one embodiment less than 15 ppm, in another embodiment less than 10 ppm and in still yet another embodiment less than 5 ppm. The 4-MeI content should be measured by liquid chromatography/mass spectrometry (LC-MS/MS) or gas chromatography/mass spectrometry on the reaction mixture as it comes from the sealed vessel ("as is"). The DE can be measured as described in "ISI 28-le Determination of Reducing Sugar, DE by Luff-Schoorl's Method" published by the International Starch Institute, Science Park Aarhus, Denmark, as Rev. LT Jan. 22, 2002.

EXAMPLES

Color Intensity Evaluation.

For the purpose of this specification, Colour Intensity is defined as the absorbance of a 0.1% (w/v) solution of Caramel Colour solids in water in a 1 cm cell at 610 nm.

Procedure:

Transfer 100 mg of Caramel Colour into a 100 ml volumetric flask, dilute to volume with water, mix and centrifuge if the solution is cloudy. Determine the absorbance ($A_{610}$) of the clear solution in a 1 cm cell at 610 nm with a suitable spectrophotometer previously standardized using water as a reference.

Brookfield Viscosity Evaluation Procedure.

The viscosity and appearance of samples were assessed using a Brookfield Viscometer Model RV-DV-II+PRO, with standard needle and a laboratory support, and Fluid 100, which is a standard of calibration available of silicone of 100 cps (available from Brookfield Engineering Laboratories, Inc., 240 Cushing St., Stoughton, Mass., USA). About 500 mL of caramel color sample was pour into a 600 mL stainless steel vessel, sliding the vessel wall to prevent the formation of air bubbles. In a recirculating water bath at a controlled temperature, the container with the sample was placed to warm up to 30° C., verifying the temperature with the help of a digital or mercury thermometer. The viscometer was placed into the holder and adjusted to the proper height. The needle viscometer was carefully connected by holding the shaft tightly and screwing the needle to the left. The guard was positioned and assembly level. The guard and caramel color needle were introduced at an angle to prevent the formation of air bubbles. Adjusted the apparatus so that the notch was on the surface of the sample. The viscometer was started at 20 or 50 rpm and spindle number 1 or 2 was used. The viscosity was read and reported.

Examples 1-15 and Comparative Example A

1. Mix glucose corn syrup (331.7 g, 42.7° Be, 77.5DE, pH 4.7) with ammonium bisulfate (79.6 g, 68% solids content, pH 5.7).
2. Adjust pH of the mixture to the value (±0.1) set forth in Table 2 or Table 3 with a mineral acid (e.g. hydrochloric or phosphoric acid).
3. Heat mixture in a sealed vessel to the temperature (±1° C.) set forth in Table 2 or Table 3.
4. Allow the reaction to proceed at this temperature until the desired color absorbance set forth in Table 2 or Table 3 is obtained.
5. After the desired color absorbance is obtained, stop the reaction with a flash step.
6. Cool and adjust caramel color pH to 3.0 and density to 1.27 g/ml.

TABLE 2

| Example | Adjusted pH after mixing | Heating Profile | Time of Heating (min.) | Color Intensity (0.1% w/v, 610 nm) | 4-MEI* (ppm) | Viscosity (cP) @ Temp. |
|---|---|---|---|---|---|---|
| A | 6.5 | Heating from 23° C. to 159° C. | 184-239 | 0.224-0.230 | ~400 to 600 | 100 @ 30° C. |
| 1 | 5.9 | Heating from 23° C. to 133° C. | 196 | 0.220 | 29.9 | 76 @ 23° C. |
| 2 | 5.5 | Heating from 23° C. to 133° C. | 177 | 0.227 | 11.1 | 80.8 @ 23° C. |
| 3 | 5.2 | Heating from 23° C. to 133° C. | 181 | 0.222 | 7.4 | 76 @ 23° C. |
| 4 | 5.1 | Heating from 23° C. to 133° C. | 181 | 0.245 | 7.2 | 102.8 @ 23° C. |
| 5 | 5.1 | Heating from 23° C. to 133° C. | 240 | >0.200 | 13.4/14 | 78 @ 30° C. |
| 6 | 4.5 | Heating from 23° C. to 133° C. | 300 | 0.215 | 10.9/11.0 | 72 @ 30° C. |
| 7 | 4.5 | Heating from 23° C. to 128° C. | 280 | 0.214 | 11.8/13.0 | 69 @ 30° C. |

*Measured "as is" by Liquid Chromatography/Mass Spectrometry (LC-MS/MS) except Example 1 was measured "as is" by Gas Chromatography/Mass Spectrometry (GC-MS).

TABLE 3

| Example | Adjusted pH after mixing | Heating Profile ° C. (for min.) | Color Intensity (0.1% w/v, 610 nm) | 4-MEI* (ppm) | Viscosity (cP) @ Temp. |
|---|---|---|---|---|---|
| A | 6.5 | Heating from 23° C. to 159° C. (184-239) | 0.224-0.230 | ~400 to 600 | 100 @ 30° C. |
| 5 | 5.5 | 60° C. (over-weekend) 95° C. (120 min), 105° C. (60 min), 115° C. (60 min), 125° C. (30 min), 142° C. (90 min) | 0.255 | 16.7 | ≤300 @ 30° C. |
| 6 | 5.5 | 68° C. (60 min), 85° C. (60 min), 95° C. (120 min), 105° C. (60 min), 115° C. (30 min), 125° C. (30 min), 142° C. (90 min) | 0.241 | 15.3 | 115.6 @ 23° C. |

TABLE 3-continued

| Example | Adjusted pH after mixing | Heating Profile ° C. (for min.) | Color Intensity (0.1% w/v, 610 nm) | 4-MEI* (ppm) | Viscosity (cP) @ Temp. |
|---|---|---|---|---|---|
| 7 | 5.5 | 68° C. (60 min), 85° C. (60 min), 95° C. (120 min), 105° C. (60 min), 115° C. (30 min), 125° C. (30 min), 142° C. (90 min) | 0.229 | 14.9 | ≤300 @ 30° C. |
| 8 | 5.1 | 60° C. (30 min), 68° C. (60 min), 78° C. (30 min), 85° C. (60 min), 90° C. (60 min), 95° C. (120 min), 100° C. (60 min), 105° C. (60 min), 115° C. (30 min), 125° C. (30 min), 138° C. (90 min) | 0.229 | 10.8 | 125.6 @ 23° C. |
| 9 | 5.1 | 60° C. (30 min), 68° C. (60 min), 78° C. (30 min), 85° C. (60 min), 90° C. (60 min), 95° C. (120 min), 100° C. (60 min), 105° C. (60 min), 115° C. (30 min), 125° C. (30 min), 138° C. (90 min) | 0.241 | 9.6 | 154.0 @ 23° C. |
| 10 | 5.1 | 60° C. (30 min), 68° C. (60 min), 78° C. (30 min), 85° C. (60 min), 90° C. (60 min), 95° C. (120 min), 100° C. (60 min), 105° C. (60 min), 115° C. (30 min), 125° C. (30 min), 138° C. (90 min) | 0.229 | 10.8 | 125.6 @ 23° C. |
| 11 | 4.5 | 68° C. (60 min), 85° C. (60 min), 95° C. (120 min), 105° C. (60 min), 115° C. (30 min), 125° C. (30 min), 138° C. (100 min) | >0.200 | 6.9 | 121.2 @ 30° C. |
| 12 | 4.5 | 68° C. (60 min), 85° C. (60 min), 95° C. (120 min), 105° C. (60 min), 115° C. (30 min), 125° C. (30 min), 138° C. (100 min) | 0.223 | 7.1 | 196.2 @ 23° C. |

*Measured "as is" by Liquid Chromatography/Mass Spectrometry (LC-MS/MS) except Example 12 was measured "as is" by Gas Chromatography/Mass Spectrometry (GC-MS).

While particular embodiments of the present application have been illustrated and described, it would be obvious to those skilled in the art that various other changes and modifications can be made without departing from the spirit and scope of the application. It is therefore intended to cover in the appended claims all such changes and modifications that are within the scope of this application. All amounts, parts and percentages are by weight unless otherwise indicated in context.

What is claimed is:

1. A process of making a caramel color comprising:
   a) mixing a carbohydrate with an ammonia compound and a sulfite compound and at pH from about 5.1 to about 6.0; and
   b) heating the mixture from step a) in a sealed vessel to a temperature of from about 120° C. to about 137° C. and maintaining a temperature in said range for at least about 1.5 hours, wherein said time and temperature are sufficient to yield a product having a color level of at least about double strength and a level of 4-methylimidazole (4-MeI) of less than about 15 ppm.

2. The process of claim 1, wherein the temperature is from about 125° C. to about 135° C.

3. The process of claim 1, wherein the temperature is from about 128° C. to about 133° C.

4. The process of claim 1, wherein the time of heating and maintaining is at least about 2 hours.

5. The process of claim 1, wherein the time of heating and maintaining is from about 2.5 hours to about 7 hours.

6. The process of claim 1, wherein the time of heating and maintaining is from about 3 hours to about 5 hours.

7. The process of claim 1, wherein the pH is from about 5.1 to about 5.7.

8. The process of claim 1, wherein the pH is from about 5.1 to about 5.5.

9. The process of claim 1, wherein the caramel color at 0.1% w/v measured at 610 nm is at least about 0.2.

10. The process of claim 1, wherein the caramel color at 0.1% w/v measured at 610 nm is at least about 0.21.

11. The process of claim 1, wherein the caramel color at 0.1% w/v measured at 610 nm is at least about 0.23.

12. The process of claim 1, wherein the 4-MeI content is less than 10 ppm.

13. A process of making a caramel color comprising:
   a) mixing a carbohydrate with an ammonia compound and a sulfite compound and at pH from about 5.1 to about 6.0;
   b) heating the mixture from step a) in a sealed vessel to a first temperature of from about 80° C. and about 110° C. and holding at about that first temperature for a first hold time of at least about 30 minutes;
   c) heating the product from step b) in a sealed vessel to a second temperature higher than the first temperature and less than about 130° C. and maintaining a temperature below about 130° C. for a second hold time of at least about 15 minutes;
   d) heating the product from step c) in a sealed vessel to a third temperature higher than the second temperature and less than about 145° C. and for a third hold time of at least about 30 minutes.

14. The process of claim 13, wherein said first hold time is at least about twice as long as said third hold time and said third hold time is at least about twice as long as said second hold time.

15. The process of claim 13, wherein said pH is from about 5.1 to about 5.5.

* * * * *